(12) United States Patent
Hoyt et al.

(10) Patent No.: US 8,590,047 B2
(45) Date of Patent: Nov. 19, 2013

(54) SYSTEM AND METHOD FOR MANAGEMENT OF VULNERABILITY ASSESSMENT

(75) Inventors: Travis E. Hoyt, Huntersville, NC (US); Mark T. Cimijotti, Indian Trail, NC (US); Jack D. Upchurch, II, Orange Beach, AL (US); Tyron Legette, Concord, NC (US); William T. Stranathan, Charlotte, NC (US); Robert A. Lang, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 309 days.

(21) Appl. No.: 12/984,154

(22) Filed: Jan. 4, 2011

(65) Prior Publication Data

US 2012/0174230 A1    Jul. 5, 2012

(51) Int. Cl.
*G06F 21/00* (2013.01)

(52) U.S. Cl.
USPC ............................................................ 726/25

(58) Field of Classification Search
None
See application file for complete search history.

(56) References Cited

U.S. PATENT DOCUMENTS

| | | | |
|---|---|---|---|
| 7,257,630 B2 | 8/2007 | Cole et al. | 709/224 |
| 8,201,257 B1 * | 6/2012 | Andres et al. | 726/25 |
| 2004/0015728 A1 * | 1/2004 | Cole et al. | 713/201 |
| 2005/0086530 A1 * | 4/2005 | Goddard | 713/201 |
| 2005/0160480 A1 | 7/2005 | Birt et al. | 726/25 |
| 2005/0257267 A1 * | 11/2005 | Williams et al. | 726/25 |
| 2006/0004614 A1 * | 1/2006 | Hutchinson et al. | 705/7 |
| 2006/0010497 A1 * | 1/2006 | O'Brien et al. | 726/26 |
| 2006/0101517 A1 * | 5/2006 | Banzhof et al. | 726/25 |
| 2006/0191012 A1 * | 8/2006 | Banzhof et al. | 726/25 |
| 2009/0260086 A1 * | 10/2009 | Lang et al. | 726/25 |
| 2010/0281543 A1 * | 11/2010 | Golomb et al. | 726/25 |
| 2010/0303211 A1 * | 12/2010 | Hartig et al. | 379/1.01 |
| 2011/0047620 A1 * | 2/2011 | Mahaffey et al. | 726/23 |
| 2011/0138469 A1 * | 6/2011 | Ye et al. | 726/25 |
| 2012/0110174 A1 * | 5/2012 | Wootton et al. | 709/224 |

* cited by examiner

*Primary Examiner* — Hadi Armouche
(74) *Attorney, Agent, or Firm* — Michael A. Springs

(57) ABSTRACT

A system and method for an optimization of fulfillment workflow includes receiving application data and determining that an application is in scope for vulnerability assessment based at least in part on the application data. Assessment information related to an assessment identifying at least one vulnerability is received from an assessor. The information regarding the assessment is communicated to a remediator. One or more remediation tasks designed to remedy the at least one vulnerability is received, and an indication of performance of a remediation task is received. An indication that a remediation task has been completed based at least in part on the indication of performance of the remediation task is communicated, and an indication of whether the remediation task remedied the at least one vulnerability is received.

24 Claims, 3 Drawing Sheets

SYSTEM AND METHOD FOR MANAGEMENT OF VULNERABILITY ASSESSMENT

TECHNICAL FIELD

The present invention relates generally to vulnerability assessment, and more particularly to management of vulnerability assessment processes.

BACKGROUND

Enterprises, including financial institutions, often employ numerous transaction and data processing systems to support daily activities. Such transaction and data processing systems may be implemented with computer-executable applications. In many instances, for example where applications interface with the Internet and/or process sensitive data, applications may be subject to security vulnerabilities unless such applications are programmed or otherwise implemented to avoid or prevent vulnerabilities. Accordingly, enterprises employing transaction and data processing systems often require extensive vulnerability assessment of these systems, including identification of vulnerabilities, remediation of vulnerabilities, and verification of remediation. Development and validation of transaction and data processing systems may be dispersed across and enterprise and may be managed by leaders from different lines of businesses and geographic regions. Thus, coordination and management of vulnerability assessment remains a challenge for enterprises.

SUMMARY

In accordance with the present disclosure, the disadvantages and problems associated with prior systems and methods for management of vulnerability assessment have been substantially reduced or eliminated.

In accordance with embodiments of the present disclosure, a method may include: (i) receiving application data; (ii) determining that an application in scope for vulnerability assessment based at least in part on the application data; (iii) receiving assessment information from an assessor related to an assessment of the application, the assessment indentifying at least one vulnerability; (iv) communicating the information regarding the assessment to a remediator; (v) receiving one or more remediation tasks associated with the assessment, the one or more remediation tasks designed to remedy the at least one vulnerability; (vi) receiving an indication of performance of a remediation task of the one or more remediation tasks; (vii) communicating an indication that a remediation task has been completed based at least in part on the indication of performance of the remediation task; and (viii) receiving an indication of whether the remediation task remedied the at least one vulnerability.

In accordance with additional embodiments of the present disclosure, an apparatus may include a network interface and a processor coupled to the network interface. The network interface may be operable to: (i) receive application data; (ii) receive assessment information from an assessor related to an assessment of the application, the assessment indentifying at least one vulnerability; (iii) receive one or more remediation tasks associated with the assessment, the one or more remediation tasks designed to remedy the at least one vulnerability; (iv) receive an indication of performance of a remediation task of the one or more remediation tasks; (v) receive an indication of whether the remediation task remedied the at least one vulnerability; (vi) communicate the information regarding the assessment to a remediator; and (vii) communicate an indication that a remediation task has been completed based at least in part on the indication of performance of the remediation task. The processor may be operable to determine that an application is in scope for vulnerability assessment based at least in part on the application data.

In accordance with further embodiments of the present disclosure, a tangible computer readable medium may include logic, the logic operable, when executed on a processor, to: (i) receive application data; (ii) determine that an application in scope for vulnerability assessment based at least in part on the application data; (iii) receive assessment information from an assessor related to an assessment of the application, the assessment indentifying at least one vulnerability; (iv) communicate the information regarding the assessment to a remediator; (v) receive one or more remediation tasks associated with the assessment, the one or more remediation tasks designed to remedy the at least one vulnerability; (vi) receive an indication of performance of a remediation task of the one or more remediation tasks; (vii) communicate an indication that a remediation task has been completed based at least in part on the indication of performance of the remediation task; and (viii) receive an indication of whether the remediation task remedied the at least one vulnerability.

Technical advantages of certain aspects of the present disclosure include an assessment validation manager operable to determine assessment scope, manage assessment scheduling and coordination, facilitate documentation and reporting of vulnerabilities, enforce a peer review process, and facilitate a process for validating vulnerability fixes. As a result, particular embodiments of the present disclosure provide numerous operational benefits. Nevertheless, particular embodiments may provide some, none, all or additional technical advantages.

BRIEF DESCRIPTION OF THE DRAWINGS

For a more complete understanding of the present invention and its advantages, reference is now made to the following description taken in conjunction with the accompanying drawings, in which.

DETAILED DESCRIPTION

Figure 1:
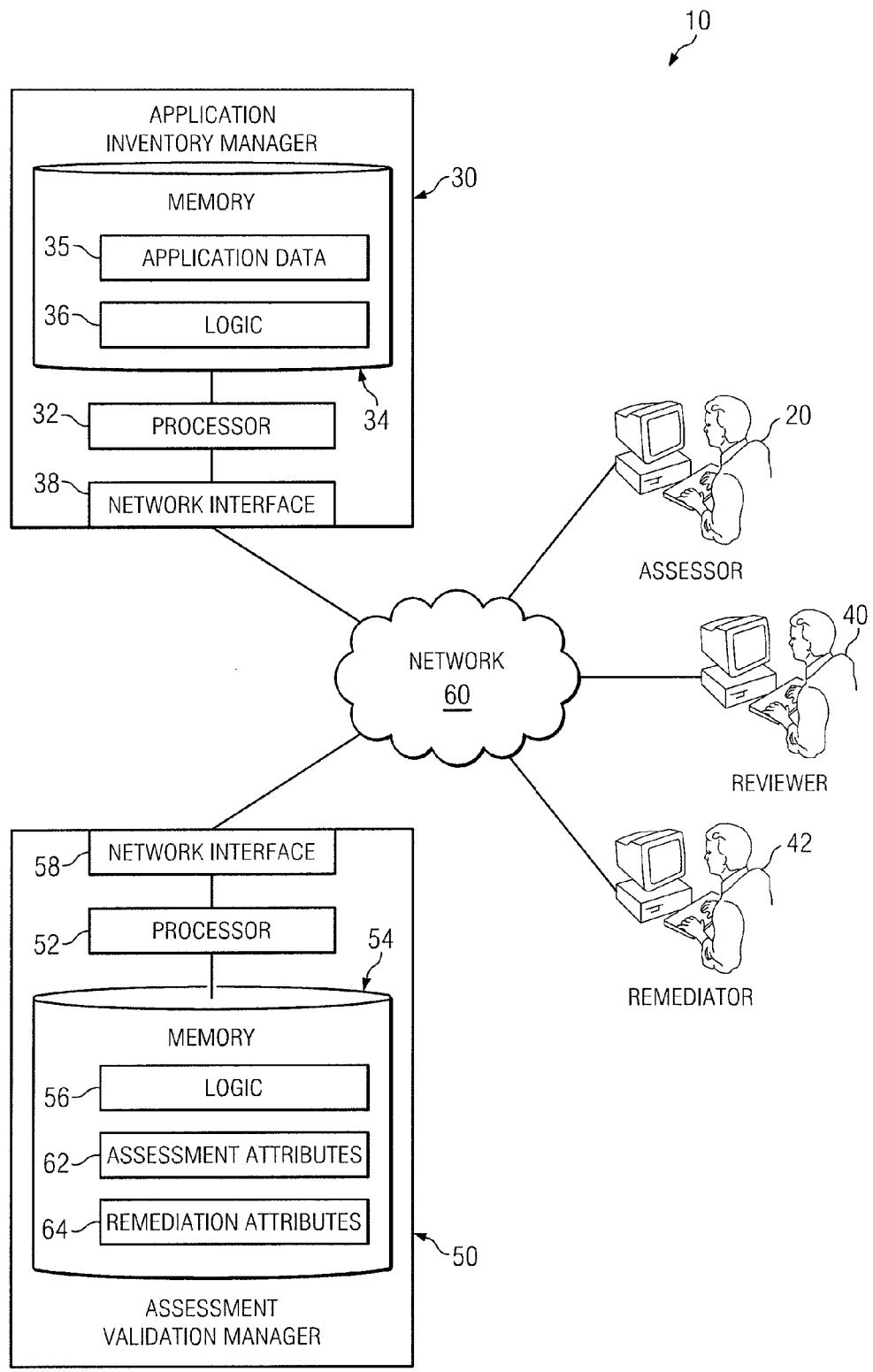
FIG. 1 illustrates a assessment validation system in accordance with particular embodiments of the present disclosure.

FIG. 1 illustrates an assessment validation system 10 in accordance with particular embodiments of the present disclosure. System 10 may include application inventory manager 30, assessment validation manager 50, assessor 20, reviewer 40, and remediator 42. Application inventory manager 30, assessment validation manager 50, assessor 20, reviewer 40, and remediator 42 may be communicatively coupled by network 60. System 10 is generally operable to facilitate management of vulnerability assessment in order to provide for efficient vulnerability assessment, as disclosed in greater detail in this disclosure.

Application inventory manager 30 may be configured to store application data 35 associated with one or more applications and to communicate such application data 35 to assessment validation manager 50, assessor 20, reviewer 40, and/or remediator 42. An application may comprise a computer-executable set of instructions designed to perform singular or multiple related specific tasks. In certain embodiments, an application may be configured to interface with the Internet and/or other communication network. Application data 35 may include any data associated with an application, including the application itself, one or more instructions of the application, and/or one or more parameters associated with the application. In some embodiments, application data 35 may include one or more parameters that may be analyzed (e.g., by assessment validation manager 50) to determine if a particular application is in scope for a vulnerability assessment.

Parameters that may be present in application data 35 include whether an application is web-based (e.g., Internet-facing application), whether an application is external to an enterprise (e.g., application accessible via a business-to-business network connection by a third party who may be a customer, vendor, or other business partner of the enterprise), whether the application includes non-public information (e.g., account numbers, social security numbers or other identifiable information), business impact of an application, regulatory implications associated with an application, integration of the application with other applications, sensitivity of data associated with the application, frequency of code changes for the code underlying an application, and/or other suitable parameters.

Application inventory manager 30 may include any suitable combination of hardware and/or software implemented in one or more modules to provide the described functions and operations. In some embodiments, application inventory manager 30 may comprise a general-purpose personal computer (PC), a Macintosh, a workstation, a Unix-based computer, a server computer, or any suitable processing device. In some embodiments, the functions and operations described above may be performed by a pool of multiple application inventory managers 30. Application inventory manager 30 may include processor 32, memory 34, logic 36, and network interface 38. Application inventory manager 30 may also include imaging and indexing software, as well as connections to external imaging devices, printers or fax machines.

Memory 34 may comprise any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as application data 35. Although FIG. 1 illustrates memory 34 as internal to application inventory manager 30, it is understood that memory 34 may be internal or external to application inventory manger 30, depending on particular implementations. Memory 34 may be separate from or integral to other memory devices to achieve any suitable arrangement of memory devices for use in system 10.

Memory 34 may be further operable to store logic 36. Logic 36 may generally comprise rules, algorithms, code, tables, and/or other suitable instructions for receiving, storing, and transmitting application data 35. Logic 36 may also additionally comprise instructions for displaying information related to application data 35 to assessor 20, reviewer 40, and/or remediator 42.

Memory 34 may be communicatively coupled to processor 32. Processor 32 may be generally operable to execute logic 36 to receive, store, and/or transmit application data, and/or display information related to application data 35 to assessor 20, reviewer 40, and/or remediator 42. Processor 32 may comprise any suitable combination of hardware and software implemented in one or more modules to provide the described function or operation.

Network interface 38 may communicate information with network 60. For example, network interface 58 receive data (e.g., application data 35 from remediator 42) via network 60. As another example, network interface 38 may communicate application data 35 to assessor 20, reviewer 40, and/or remediator 42 via network 60. Network interface 38 may represent any port or connection, real or virtual, including any suitable hardware and/or software that enables application inventory manager 30 to exchange information with network 60, assessment validation manager 50, assessor 20, reviewer 40, remediator 42, and/or or other components of system 10.

Assessment validation manager 50 may generally be operable to facilitate management of a vulnerability process for applications. For example, assessment validation manager 50 may receive application data 35 from application inventory manager 30 and, based on an analysis of application data 35, determine one or more applications in scope for a vulnerability assessment. Whether or not an application is in scope for a vulnerability assessment may be based on one or more parameters communicated as part of application data 35, including without limitation one or more of those parameters set forth above. In some embodiments, such determination may be based on a scoring methodology that assigns individual scores to one or more parameters and aggregates such scores to determine an overall vulnerability risk score for an application. After assessment validation manager 50 has determined an application to be in scope for a vulnerability assessment, a vulnerability assessment task may be placed in a queue. The queue may be stored as part of assessment attributes 62 in memory 54 of assessment validation manager 50. Queue order may be determined in any suitable fashion, including first-in/first-out or based on a vulnerability risk score assigned to each of the applications in the queue.

Once an application is placed in a queue by assessment validation manager 50, an assessor 20 may be assigned to assessment of the application and may assess the application for vulnerabilities. Assessor 20 may represent any person who may receive application data 35 from application inventory manager 30 and/or assessment attributes 62 from assessment validation manager 50 via network 60, assess an application for vulnerabilities by reviewing, evaluating, and/or otherwise using application data 35 and/or assessment attributes 62 (e.g., by examining coded programming language for the application and/or witnessing the execution of the application on a computing device), and communicating findings related to the assessment to assessment validation manager 50. For example, during and/or after the assessment of an application by assessor 20, assessor 20 may communicate to assessment validation manager 50 information related to the assessor's assessment, including without limitation written documentation of the assessor's findings and/or screen captures related to the findings. Upon receipt, assessment validation manager 50 may store the information related to the assessor's assessment as part of assessment attributes 62. In some embodiments, assessment validation manager 50 may be configured to display information to assessor 20 (e.g., on a computer display monitor) based on application data 35 and/or assessment attributes 62 and/or receive information from assessor 20 via an interactive display displayed to assessor 20.

An assessor 20 may communicate with assessment validation manager 50 via a computer, telephone or other electronic device interfaced to network 60. For example, assessor 20 may interface with assessment validation manager 50 via a web browser or other software configured to interact with assessment validation manager 50. Although FIG. 1 depicts one assessor 20 present in system 10, system 10 may include any suitable number of assessors 20.

After information related to the assessment is received by assessment validation manager 50, assessment validation manager 50 may communicate assessment attributes 62, including information related to assessor 20's assessment of an application, to a reviewer 40. Reviewer 40 may represent any person who may receive application data 35 from application inventory manager 30 and/or assessment attributes 62 (including information related to assessor 20's assessment of an application) from assessment validation manager via network 60 in order to review the assessment performed by assessor 20. In some embodiments, reviewer 40 may review an assessment by reviewing, evaluating, and/or otherwise using application data 35 and/or assessment attributes 62 (e.g., by examining the assessor's findings, by examining coded programming language for the application, and/or witnessing the execution of the application on a computing device), and communicate findings related to the review to assessment validation manager 50. For example, during and/or after the review of an assessment by reviewer 40, reviewer 40 may communicate to assessment validation manager 50 information related to the review, including without limitation written documentation of the reviewer's findings and/or revisions by reviewer 40 to assessor 20's findings. In some embodiments, assessment validation manager 50 may be configured to display information to reviewer 20 (e.g., on a computer display monitor) based on application data 35 and/or assessment attributes 62 (including information related to assessor 20's assessment of the application) and/or receive information from reviewer 40 via an interactive display displayed to reviewer 40. Upon receipt of the information communicated by reviewer 40, assessment validation manager 50 may store the information related to the reviewer's review as part of assessment attributes 62.

A reviewer 40 may communicate with assessment validation manager 50 via a computer, telephone or other electronic device interfaced to network 60. For example, reviewer 40 may interface with assessment validation manager 50 via a web browser or other software configured to interact with assessment validation manager 50. Although FIG. 1 depicts one reviewer 40 present in system 10, system 10 may include any suitable number of reviewers 40.

After assessment and review of the assessment are complete, assessment validation manager 50 may communicate assessment attributes 62, including information related to assessor 20's assessment of an application and/or reviewer 40's review of the assessment, to a remediator 42. Remediator 42 may represent any person who may receive application data 35 from application inventory manager 30 and/or assessment attributes 62 (including information related to assessor 20's assessment of an application and/or reviewer 40's review of the assessment) from assessment validation manager 50 via network 60 in order to examine the assessment and the review to determine a remediation plan for remedying the vulnerabilities identified by assessor 20 and/or reviewer 40. One or more remediation tasks associated with the remediation plan may be communicated by remediator 42 to assessment validation manager 50 to be stored as part of remediation attributes 64. In some embodiments, assessment validation manager 50 may be configured to display information to remediator 42 (e.g., on a computer display monitor) based on application data 35 and/or assessment attributes 62 (including information related to assessor 20's assessment of an application and/or reviewer 40's review of the assessment) and/or receive information from remediator 42 via an interactive display displayed to remediator 42. As the various remediation tasks are performed, remediator 42 and/or another person may communicate the occurrence of such performance to assessment validation manager 50, and in response, assessment validation manager 50 may modify remediation attributes 64 to indicate the status of performance for each of the tasks.

A remediator 42 may communicate with assessment validation manager 50 via a computer, telephone or other electronic device interfaced to network 60. For example remediator 42 may interface with assessment validation manager 50 via a web browser or other software configured to interact with assessment validation manager 50. Although FIG. 1 depicts one remediator 42 present in system 10, system 10 may include any suitable number of remediators 42.

In addition, assessment validation manager 50 may be configured to generate an interactive display (e.g., to remediator 42) to facilitate remediation of vulnerabilities identified in an application, including facilitating performing of the one or more remediation tasks. For example, assessment validation manager 50 may generate an interactive display to remediator 42 and/or another person (e.g., on a computer display monitor) based on remediation attributes 64 wherein such display sets forth statuses of the various remediation tasks and/or provides a user interface to allow remediator 42 and/or another person to enter information (e.g., status updates for remediation tasks and/or other suitable information) for communication to assessment validation manager 50. As another example, assessment validation manager may be configured to generate reports based on application data 35, assessment attributes 62, and/or remediation attributes 64.

After a remediation task is completed, as indicated by data present in remediation attributes 64, assessment validation manager 50 may communicate to an assessor 20, reviewer 40, remediator 42, and/or another person an indication that a remediation task has been completed (e.g., by displaying an indication to such person regarding completion). In response to such indication, an assessor 20, reviewer 40, remediator 42, and/or another person may perform a remediation assessment for the remediation task to determine if the completion of the remediation task adequately corrected the vulnerability associated with the remediation task. After completing the remediation assessment, the person conducting the remediation assessment may communicate to assessment validation manager 50 whether the remediation task passed or failed, and assessment validation manager 50 may modify remediation attributes 64 to reflect such determination.

In the event that a remediation task has failed, assessment validation manager 50 may communicate to a remediator 42, and/or another person an indication that a remediation task has failed (e.g., by displaying an indication to such person regarding failure). In response, remediator 42 and/or another person may again determine a remediation plan for remedying the identified vulnerability, and a process similar to that disclosed above may be repeated.

Assessment validation manager 50 may include any suitable combination of hardware and/or software implemented in one or more modules to provide the described functions and operations. In some embodiments, assessment validation manager 50 may comprise a general-purpose personal computer (PC), a Macintosh, a workstation, a Unix-based computer, a server computer, or any suitable processing device. In some embodiments, the functions and operations described above may be performed by a pool of multiple assessment validation managers 50. Assessment validation manager 50 may include processor 52, memory 54, logic 56, and network interface 58. Assessment validation manager 50 may also include imaging and indexing software, as well as connections to external imaging devices, printers or fax machines.

Memory 54 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as assessment attributes 62 and remediation attributes 64. Although FIG. 1 illustrates memory 54 as internal assessment validation manager 50, it is understood that memory 54 may be internal or external to assessment validation manger 50, depending on particular implementations. Memory 54 may be separate from or integral to other memory devices to achieve any suitable arrangement of memory devices for use in system 10.

Memory 54 is further operable to store logic 56. Logic 56 may generally comprise rules, algorithms, code, tables, and/or other suitable instructions for performing the various functionality of assessment validation manager 50, as described elsewhere in this disclosure.

Memory 54 may be communicatively coupled to processor 52. Processor 52 may be generally operable to execute logic 56 to perform the various functionality of assessment validation manager 50, as described elsewhere in this disclosure. Processor 52 comprises any suitable combination of hardware and software implemented in one or more modules to provide the described function or operation.

Network interface 58 may communicate information with network 60. Network interface 58 represents any port or connection, real or virtual, including any suitable hardware and/or software that enables assessment validation manager 50 to exchange information with network 60, application inventory manager 30, assessor 20, reviewer 40, remediator 42, and/or or other components of system 10.

Network 60 may represent any number and combination of wireline and/or wireless networks suitable for data transmission. Application inventory manager 30, assessment validation manager 50, assessor 20, reviewer 40, remediator 42 may be communicatively coupled via one or more networks 60. Network 60 may, for example, communicate internet protocol packets, frame relay frames, asynchronous transfer mode cells, and/or other suitable information between network addresses. Network 60 may include one or more intranets, local area networks, metropolitan area networks, wide area networks, cellular networks, all or a portion of the Internet, and/or any other communication system or systems at one or more locations.

Figure 2A:
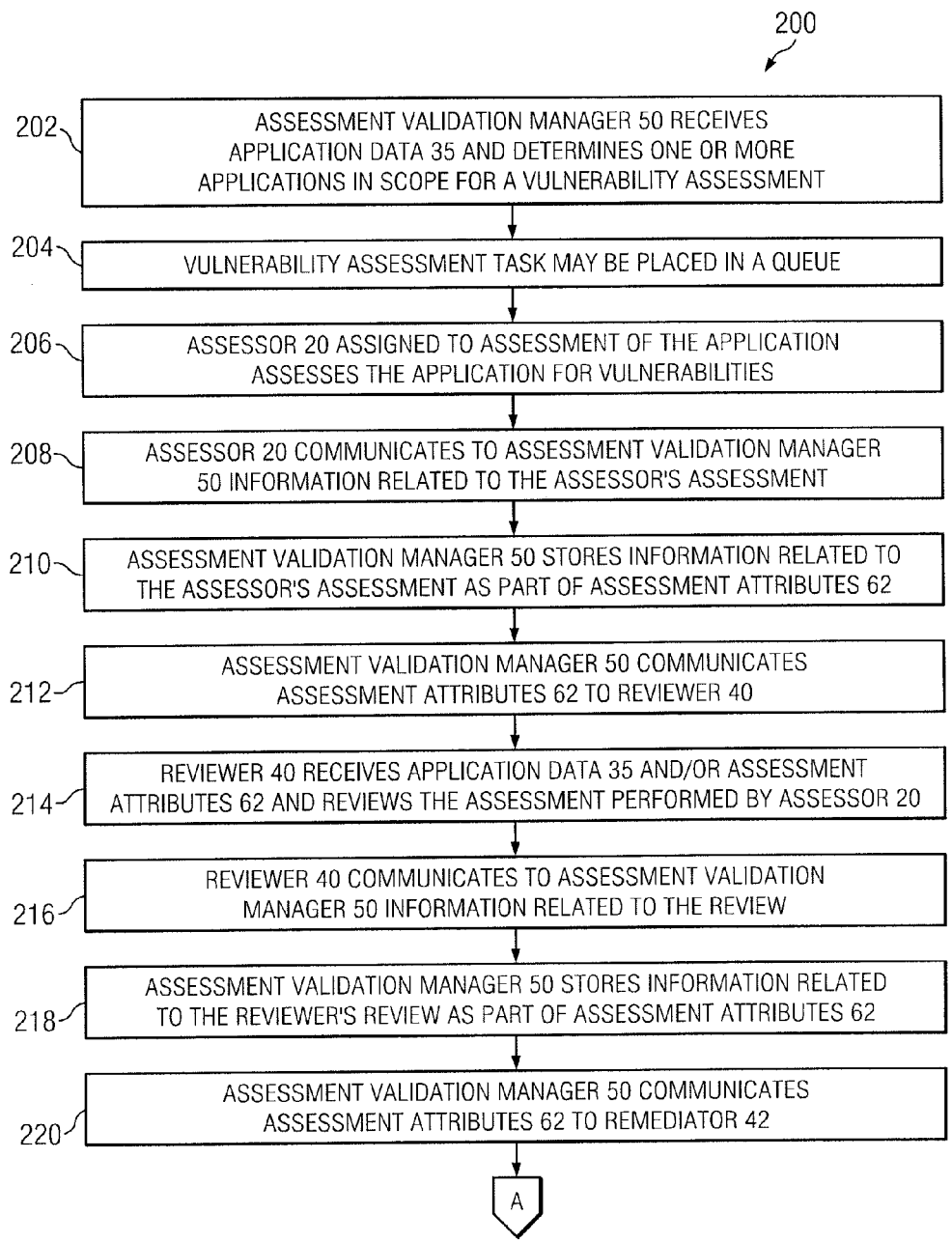
FIGS. 2A-2B illustrate a flow chart illustrating an example method of a particular operation of the assessment validation system of FIG. 1 in accordance with particular embodiments of the present disclosure.
Figure 2B:
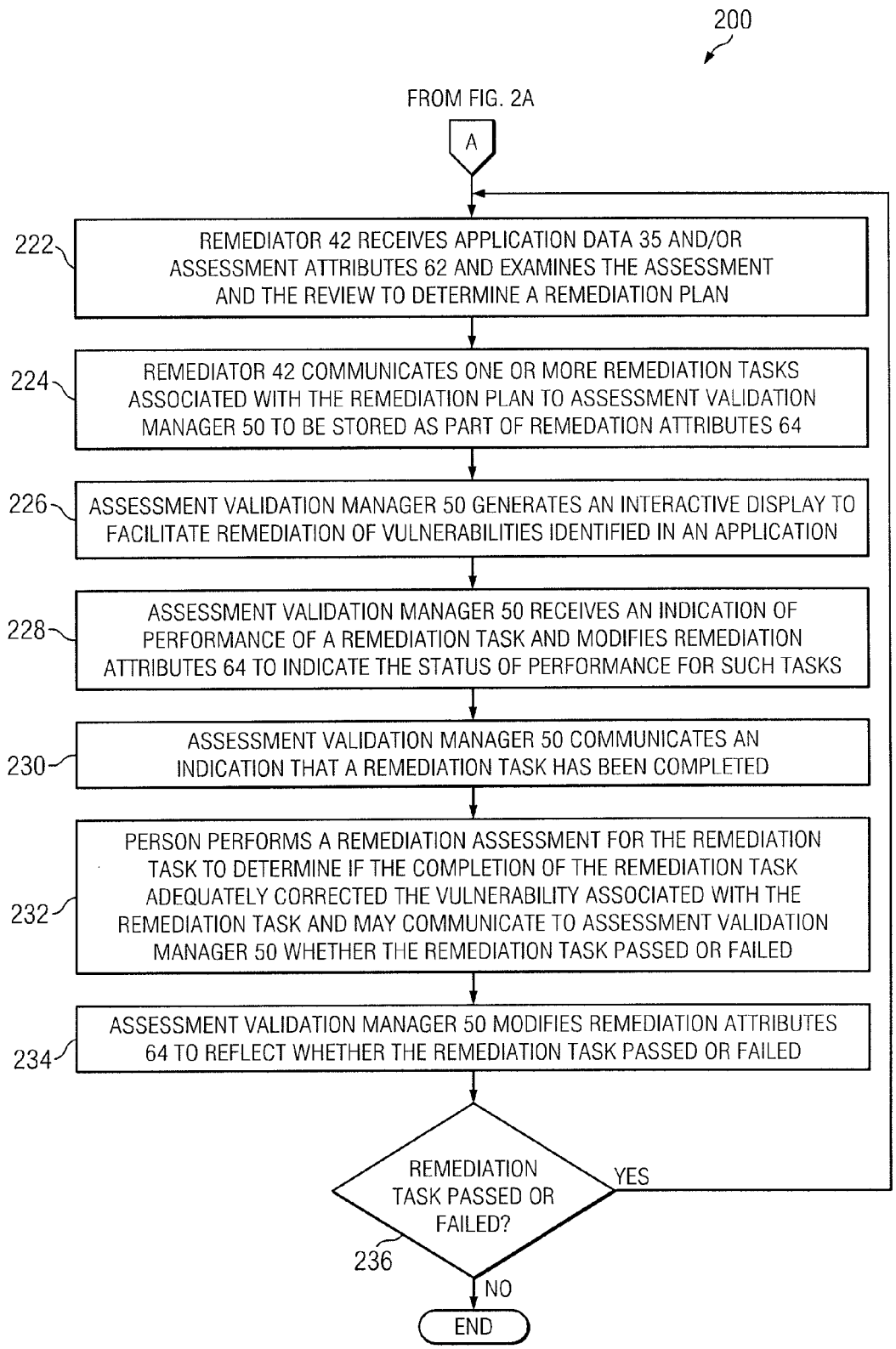

FIGS. 2A-2B illustrate a flow chart illustrating an example method 200 of a particular operation of assessment validation system 10 of FIG. 1 in accordance with particular embodiments of the present disclosure. According to one embodiment, method 200 may begin at step 202. As noted above, teachings of the present disclosure may be implemented in a variety of configurations of system 10. As such, the preferred initialization point for method 200 and the order of the steps 202-236 comprising method 200 may depend on the implementation chosen.

At step 202, assessment validation manager 50 may receive application data 35 from application inventory manager 30 and, based on an analysis of application data 35, determine one or more applications in scope for a vulnerability assessment. For example, assessment validation manager 50 may make such determination based on one or more parameters communicated as part of application data 35. For example, assessment validation manager may identify those applications that are web-based (e.g., Internet-facing application), external to an enterprise (e.g., application accessible via a business-to-business network connection by a third party who may be a customer, vendor, or other business partner of the enterprise), and/or include non-public information (e.g., account numbers, social security numbers or other identifiable information). Such identified applications may then be assigned a risk-based score based on one or more parameters including business impact of an application, regulatory implications associated with an application, integration of the application with other applications, sensitivity of data associated with the application, frequency of code changes for the code underlying an application, and/or other suitable parameters. The resulting score may indicate those applications in scope for vulnerability assessment (e.g., those applications having a risk-based score in excess of a certain amount). In addition, the resulting score may indicate those applications in scope for automated vulnerability assessment, and those application in scope for manual vulnerability assessment.

At step 204, a vulnerability assessment task may be placed in a queue. In some embodiments, the queue may be stored as part of assessment attributes 62 in memory 54 of assessment validation manager 50. Queue order may be determined in any suitable fashion, including first-in/first-out or based on a vulnerability risk score assigned to each of the applications in the queue.

At step 206, an assessor 20 may be assigned to assessment of the application and may assess the application for vulnerabilities. For example, assessor 20 may receive application data 35 from application inventory manager 30 and/or assessment attributes 62 from assessment validation manager 50 via network 60 and assess an application for vulnerabilities by reviewing, evaluating, and/or otherwise using application data 35 and/or assessment attributes 62 (e.g., by examining coded programming language for the application and/or witnessing the execution of the application on a computing device).

At step 208, assessor 20 may communicate to assessment validation manager 50 information related to the assessor's assessment. Such information may include, without limitation, written documentation of the assessor's findings and/or screen captures related to the findings.

At step 210, assessment validation manager 50 may store the information related to the assessor's assessment as part of assessment attributes 62.

At step 212, assessment validation manager 50 may communicate assessment attributes 62, including information related to assessor 20's assessment of an application, to a reviewer 40.

At step 214, reviewer 40 may receive application data 35 from application inventory manager 30 and/or assessment attributes 62 (including information related to assessor 20's assessment of an application) from assessment validation manager 50 in order to review the assessment performed by assessor 20. In some embodiments, reviewer 40 may review an assessment by reviewing, evaluating, and/or otherwise using application data 35 and/or assessment attributes 62 (e.g., by examining the assessor's findings, by examining coded programming language for the application, and/or witnessing the execution of the application on a computing device), and communicate findings related to the review to assessment validation manager 50.

At step 216, during and/or after the review of an assessment by reviewer 40, reviewer 40 may communicate to assessment validation manager 50 information related to the review. Such information may include, without limitation, written documentation of the reviewer's findings and/or revisions by reviewer 40 to assessor 20's findings.

At step 218, assessment validation manager 50 may store the information related to the reviewer's review as part of assessment attributes 62.

At step 220, assessment validation manager 50 may communicate assessment attributes 62, including information related to assessor 20's assessment of an application and/or reviewer 40's review of the assessment, to a remediator 42.

At step 222, remediator 42 may receive application data 35 from application inventory manager 30 and/or assessment attributes 62 (including information related to assessor 20's assessment of an application and/or reviewer 40's review of the assessment) from assessment validation manager 50 in order to examine the assessment and the review to determine a remediation plan for remedying the vulnerabilities identified by assessor 20 and/or reviewer 40.

At step 224, one or more remediation tasks associated with the remediation plan may be communicated by remediator 42 to assessment validation manager 50 to be stored as part of remediation attributes 64.

At step 226, assessment validation manager 50 may generate an interactive display to facilitate remediation of vulnerabilities identified in an application. For example, assessment validation manager 50 may generate an interactive display to remediator 42 and/or another person (e.g., on a computer display monitor) based on remediation attributes 64 wherein such display sets forth statuses of the various remediation tasks and/or provides a user interface to allow remediator 42 and/or another person to enter information (e.g., status updates for remediation tasks and/or other suitable information) for communication to assessment validation manager 50.

At step 228, assessment validation manager 50 may receive an indication of performance of a remediation task and may modify remediation attributes 64 to indicate the status of performance for such tasks. In some embodiments, such indication may be communicated via the interactive user interface displayed at step 226.

At step 230, assessment validation manager 50 may communicate to an assessor 20, reviewer 40, remediator 42, and/or another person an indication that a remediation task has been completed (e.g., by displaying an indication to such person regarding completion via an interactive display).

At step 232, an assessor 20, reviewer 40, remediator 42, and/or another person may perform a remediation assessment for the remediation task to determine if the completion of the remediation task adequately corrected the vulnerability associated with the remediation task and may communicate to assessment validation manager 50 whether the remediation task passed or failed At step 234, assessment validation manager 50 may modify remediation attributes 64 to reflect whether the remediation task passed or failed.

At step 236, assessment validation manager may, based on remediation attributes, determine whether a remediation task has failed. If the remediation task has failed, method 200 may proceed again to step 222 with respect to the failed task. Otherwise, method 200 may end with respect to the passed remediation task.

Although FIGS. 2A-2B disclose a particular number of steps to be taken with respect to method 200, method 200 may be executed with greater or lesser steps than those depicted in FIGS. 2A-2B. In addition, although FIGS. 2A-2B disclose a certain order of steps to be taken with respect to method 200, the steps comprising method 200 may be completed in any suitable order. In addition, the steps comprising method 200 may be repeated, independently and/or collectively, as often as desired or required by a chosen implementation.

Method 200 may be implemented using system 10 or any other system operable to implement method 200. In certain embodiments, method 200 may be implemented partially or fully in software and/or firmware embodied in computer-readable media.

Based on the foregoing operations, system 10 may optimize management of vulnerability assessment. For example, system 10 may determine assessment scope, manage assessment scheduling and coordination, facilitate documentation and reporting of vulnerabilities, enforce a peer review process, and facilitate a process for validating vulnerability fixes. As a result, system 10 provides numerous operational benefits. Nevertheless, particular embodiments of system 10 may provide some, none, all, or additional operational benefits.

Modifications, additions, or omissions may be made to system 10 without departing from the scope of the present disclosure. For example, when a component of system 10 determines information, the component may determine the information locally or may receive the information from a remote location. As another example, in the illustrated embodiment, application inventory manager 30 and assessment validation manager 50 are represented as different components of system 10. However, the functions of application inventory manager 30 and/or assessment validation manager 50 may be performed by any suitable combination of one or more servers or other components at one or more locations. In the embodiment where the various components are servers, the servers may be public or private servers, and each server may be a virtual or physical server. The server may include one or more servers at the same or at remote locations. Also, one or more of application inventory manager 30 and assessment validation manager 50 may include any suitable component that functions as a server. Additionally, system 10 may include any number of application inventory managers 30 and/or assessment validation managers 50. Any suitable logic may perform the functions of system 10 and the components within system 10.

What is claimed is:

1. An apparatus, comprising:
   a network interface configured to:
      receive application data;
      provide access to at least a portion of the application data via a business-to-business network connection by a third party;
   a processor coupled to the network interface, the processor configured to:
      calculate a risk score based on one or more parameters received in the application data; and
      determine that the application is in scope for vulnerability assessment based at least in part on the risk score calculated based on the one or more parameters received in the application data, the one or more parameters comprising at least the sensitivity of data associated with the application and whether the application is accessible via the business-to-business network connection by the third party;
   in response to determining that the application is in scope for vulnerability assessment based at least in part on risk score calculated based on the one or more parameters comprising at least the sensitivity of data associated with the application and whether the application is accessible via the business-to-business network connection by the third party, the network interface further configured to:
      receive assessment information from an assessor related to an assessment of the application, the assessment identifying at least one vulnerability;

receive a remediation plan comprising one or more remediation tasks associated with the assessment from a remediator, the one or more remediation tasks designed to remedy the at least one vulnerability;

in response to receiving the remediation plan, generate an interactive display to facilitate remediation of the at least one vulnerability;

receive, via the interactive display generated to facilitate the remediation of the at least one vulnerability, an indication of performance of a remediation task of the one or more remediation tasks;

receive an indication of whether the remediation task remedied the at least one vulnerability;

communicate the information regarding the assessment to a remediator; and communicate an indication that the remediation task has been completed based at least in part on the indication of performance of the remediation task.

2. An apparatus according to claim 1, the network interface further configured to:
communicate the information regarding the assessment to a reviewer;
receive review information from the reviewer related to a review of the assessment; and
communicate the review information regarding the review to the remediator.

3. An apparatus according to claim 1, further comprising the processor configured to generate a display including a listing of the one or more remediation tasks and a status associated with each of the one or more remediation tasks.

4. An apparatus according to claim 3, wherein generating the display including a listing of the one or more remediation tasks and a status associated with each of the one or more remediation tasks includes indicating, as part of the display, whether each of the one or more remediation tasks is complete.

5. An apparatus according to claim 3, wherein generating the display including the listing of the one or more remediation tasks and the status associated with each of the one or more remediation tasks includes indicating, as part of the display, whether the remediation task remedied the at least one vulnerability.

6. The apparatus according to claim 1, wherein the network interface is configured to:
receive the assessment information from a first user comprising the assessor; and
receive the one or more remediation tasks from a second user comprising the remediator.

7. The apparatus of claim 6, wherein the network interface is further configured to:
communicate the information regarding the assessment to a third user comprising a reviewer;
receive review information from the third user comprising the reviewer, the review information related to a review of the assessment; and
communicate the review information regarding the review to the second user comprising the remediator.

8. An apparatus according to claim 1, wherein the at least one parameter comprises whether the application includes non-public information associated with a customer.

9. A tangible non-transitory computer readable medium comprising logic, the logic configured, when executed on a processor, to:
receive application data;
provide access to at least a portion of the application data via a business-to-business network connection by a third party;
calculate a risk score based on one or more parameters received in the application data;
determine that the application in scope for vulnerability assessment based at least in part on risk score calculated based on the one or more parameters received in the application data, the one or more parameters comprising at least the sensitivity of data associated with the application and whether the application is accessible via the business-to-business network connection by the third party;
in response to determining that the application is in scope for vulnerability assessment based at least in part on risk score calculated based on the one or more parameters comprising at least the sensitivity of data associated with the application and whether the application is accessible via the business-to-business network connection by the third party;
receive assessment information from an assessor related to an assessment of the application, the assessment identifying at least one vulnerability;
communicate the information regarding the assessment to a remediator;
receive a remediation plan comprising one or more remediation tasks associated with the assessment from the remediator, the one or more remediation tasks designed to remedy the at least one vulnerability;
in response to receiving the remediation plan, generate an interactive display to facilitate remediation of the at least one vulnerability;
receive, via the interactive display generated to facilitate the remediation of the at least one vulnerability, an indication of performance of a remediation task of the one or more remediation tasks;
communicate an indication that the remediation task has been completed based at least in part on the indication of performance of the remediation task; and
receive an indication of whether the remediation task remedied the at least one vulnerability.

10. A tangible non-transitory computer-readable medium according to claim 9, further comprising the logic further configured to:
communicate the information regarding the assessment to a reviewer;
receive review information from the reviewer related to a review of the assessment; and
communicate the review information regarding the review to the remediator.

11. A tangible non-transitory computer-readable medium according to claim 9, further comprising the logic further configured to generate a display including a listing of the one or more remediation tasks and a status associated with each of the one or more remediation tasks.

12. A tangible non-transitory computer-readable medium according to claim 11, wherein generating the display including a listing of the one or more remediation tasks and a status associated with each of the one or more remediation tasks includes indicating, as part of the display, whether each of the one or more remediation tasks is complete.

13. A tangible non-transitory computer-readable medium according to claim 11, wherein generating the display including the listing of the one or more remediation tasks and the status associated with each of the one or more remediation tasks includes indicating, as part of the display, whether the remediation task remedied the at least one vulnerability.

14. The tangible non-transitory computer readable medium according to claim 9, further comprising the logic further configured to:
receive the assessment information from a first user comprising the assessor; and
receive the one or more remediation tasks from a second user comprising the remediator.

15. The tangible non-transitory computer readable medium according to claim 14, further comprising the logic further configured to:
communicate the information regarding the assessment to a third user comprising a reviewer;
receive review information from the third user comprising the reviewer; the review information related to a review of the assessment; and
communicate the review information regarding the review to the second user comprising the remediator.

16. An tangible non-transitory computer-readable medium according to claim 9, wherein the at least one parameter comprises whether the application includes non-public information associated with a customer.

17. A method, comprising:
receiving application data;
providing access to at least a portion of the application data via a business-to-business network connection by a third party;
calculating a risk score based on one or more parameters received in the application data;
determining that the application is in scope for vulnerability assessment based at least in part on risk score calculated based on the one or more parameters received in the application data, the one or more parameters comprising at least the sensitivity of data associated with the application and whether the application is accessible via the business-to-business network connection by the third party;
in response to determining that the application is in scope for vulnerability assessment based at least in part on risk score calculated based on the one or more parameters comprising at least the sensitivity of data associated with the application and whether the application is accessible via the business-to-business network connection by the third party:
receiving assessment information from an assessor related to an assessment of the application, the assessment identifying at least one vulnerability;
communicating the information regarding the assessment to a remediator;
receiving a remediation plan comprising one or more remediation tasks associated with the assessment from the remediator, the one or more remediation tasks designed to remedy the at least one vulnerability;
in response to receiving the remediation plan, generate an interactive display to facilitate remediation of the at least one vulnerability;
receiving, via the interactive display generated to facilitate the remediation of the at least one vulnerability, an indication of performance of a remediation task of the one or more remediation tasks;
communicating an indication that the remediation task has been completed based at least in part on the indication of performance of the remediation task; and
receiving an indication of whether the remediation task remedied the at least one vulnerability.

18. A method according to claim 17, further comprising:
communicating the information regarding the assessment to a reviewer;
receiving review information from the reviewer related to a review of the assessment; and
communicating the review information regarding the review to the remediator.

19. A method according to claim 17, further comprising generating a display including a listing of the one or more remediation tasks and a status associated with each of the one or more remediation tasks.

20. A method according to claim 19, wherein generating the display including the listing of the one or more remediation tasks and the status associated with each of the one or more remediation tasks includes indicating, as part of the display, whether each of the one or more remediation tasks is complete.

21. A method according to claim 19, wherein generating the display including the listing of the one or more remediation tasks and the status associated with each of the one or more remediation tasks includes indicating, as part of the display, whether the remediation task remedied the at least one vulnerability.

22. The method according to claim 17, wherein:
receiving the assessment information from the assessor comprises receiving the assessment information from a first user; and
receiving the one or more remediation tasks from the remediator comprises receiving the one or more remediation tasks from a second user.

23. The method of claim 22, further comprising:
communicating the information regarding the assessment to a third user comprising a reviewer;
receiving review information from the third user comprising the reviewer, the review information related to a review of the assessment; and
communicating the review information regarding the review to the second user comprising the remediator.

24. A method according to claim 17, wherein the at least one parameter comprises whether the application includes non-public information associated with a customer.

* * * * *